United States Patent [19]

Shimawaki et al.

[11] Patent Number: 5,623,497
[45] Date of Patent: Apr. 22, 1997

[54] BIT ERROR RATE MEASUREMENT APPARATUS

[75] Inventors: Kazuhiro Shimawaki, Gyoda; Tetsuo Sotome, Tatebayashi; Takayuki Nakajima, Gyoda, all of Japan

[73] Assignee: Advantest Corporation, Tokyo, Japan

[21] Appl. No.: 386,660

[22] Filed: Feb. 9, 1995

[30] Foreign Application Priority Data

Feb. 9, 1994 [JP] Japan .................................. 6-036527

[51] Int. Cl.$^6$ .................................................. G06F 11/00
[52] U.S. Cl. .......................................... 371/5.1; 371/57.2
[58] Field of Search .............................. 371/5.1, 27, 47.1, 371/20.4, 42, 46, 67.1, 57.2, 5.5, 5.2, 5.3; 370/100.1; 375/354, 357, 359, 368

[56] References Cited

U.S. PATENT DOCUMENTS

| | | | |
|---|---|---|---|
| 3,851,251 | 11/1974 | Wigner et al. | 235/55 |
| 4,385,384 | 5/1983 | Rosbury et al. | 371/22 |
| 5,305,323 | 4/1994 | Lada | 371/5.1 |

*Primary Examiner*—Hoa T. Nguyen
*Assistant Examiner*—Phung My Chung
*Attorney, Agent, or Firm*—Knobbe, Martens, Olson & Bear, LLP

[57] ABSTRACT

A bit error measurement apparatus is capable of easily specifying pattern conditions which cause bit errors in an incoming signal pattern without measuring all of a test pattern by measuring a bit error rate at a selected position or region of a test pattern. The bit error measurement apparatus includes a test pattern generator which generates the test pattern for verifying the incoming signal to be tested, a verifier which receives the incoming signal and the test pattern and generates a bit error detection signal when the incoming signal and the test pattern disagree, a pattern position detector which detects a measurement region of the test pattern when receiving a synchronizing signal from the test pattern generator and generates a count enable signal corresponding to the detected measurement region, and an error counter which counts the bit error detection signal from the verifier based on the count enable signal from the pattern position detector.

7 Claims, 9 Drawing Sheets

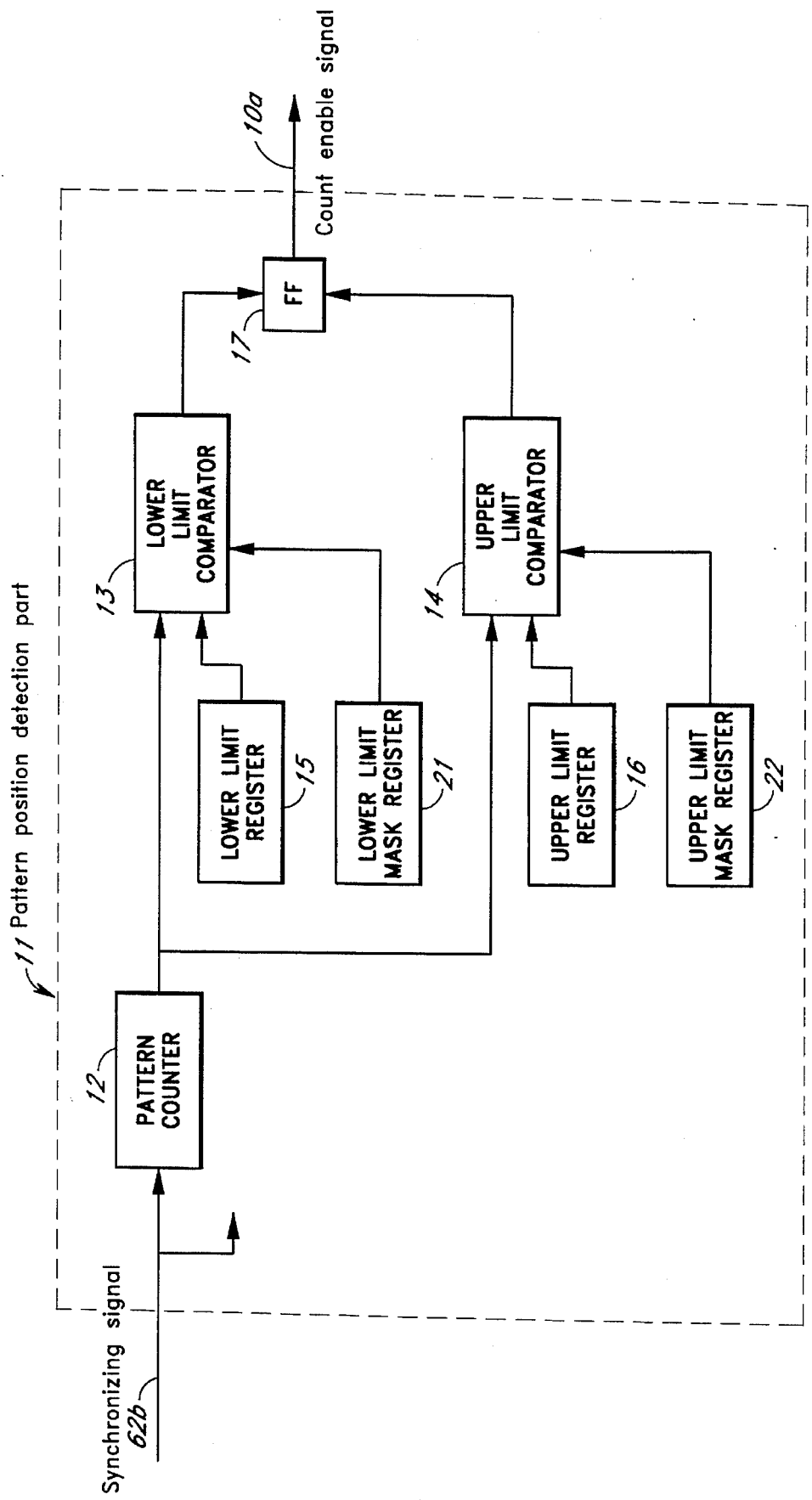

BIT ERROR RATE MEASUREMENT APPARATUS

FIELD OF THE INVENTION

The present invention relates to a bit error rate measurement apparatus which measures a bit error rate at selected positions or regions of a test pattern.

BACKGROUND OF THE INVENTION

FIG. 6 illustrates an example of basic configuration for testing a bit error rate of a signal pattern by using a bit error rate measurement apparatus. When measuring a bit error rate of a device under test 74, the device under test 74 receives a test pattern 72 and a clock 73 from a pattern generator 71. A bit error measurement apparatus 75 is provided with a signal 61 to be measured and a clock 60 which are output from the device under test 74 to perform a bit error measurement. In a situation like this, it is required that the test pattern 72 and a test pattern generated by the test pattern generator in the bit error measurement apparatus 75 must be the same pattern data.

In executing the bit error test in a critical condition such as an ultra high speed, 10 GHz for example, the likelihood of error in a serial pattern signal in the device under test 74 will increase. The bit error rate measurement apparatus of the present invention is to analyze such pattern conditions which cause a bit error rate.

FIG. 7a shows a block diagram of a conventional bit error measurement apparatus to explain the procedure of bit error measurement. The bit error measurement apparatus comprises a demultiplexer 64, a test pattern generator 62, a demultiplexer 63, a verifier 65, an error counter 70, and a pattern synchronizing part 66. The pattern synchronizing part 66 includes a synchronization detecting counter 66a, a threshold register 66b, and a comparator 66c. The pattern synchronizing part 66 synchronizes a signal pattern 61 to be measured with a test pattern generated by the test pattern generator 62.

Demultiplexer 63 and 64 are to convert an ultra high speed serial input signal into parallel data. In this embodiment, the serial input signal is converted to 16 bit-parallel low speed signals 63a and 64a, which make the following circuits feasible to be formed with high or middle speed ECL devices.

Pattern synchronization considered here means that even if an unknown signal 61 to be measured has some errors, and if a rate of such errors is lower than a specified rate set by a threshold register 66b, it is considered as synchronous. The synchronization detection counter 66a counts the bit error number for every predetermined time period. After the predetermined time period, a bit error number greater than a specified number is detected by comparing the counted value with a value stored in the threshold register 66b, and a pulse signal 67 is generated by a comparator 66c for masking the clock signal 60.

The test pattern generator 62 receives the clock mask signal 67 and outputs the next test pattern by delaying the output phase of a test pattern 62a by one bit of clock signal 60. This timing delay operation is repeated until the synchronization between the test pattern 62a and the signal 61 to be measured is reached. When the measuring signal 61 is synchronized with the test pattern 62a, the clock mask signal 67 from the comparator 66c becomes inactive.

The above-mentioned operation is a preliminary procedure for a bit error measurement. After reaching the synchronous state as above, the test pattern 62a is generated in synchronism with the measuring signal 61 throughout the test as a reference pattern. The bit error rate measurement proceeds under this situation as described below.

Because of 16 bits parallel operation of the error counter 70 in this example, the error bit number of a bit error detection signal 65a can be 0–16. After converting this plural error bit numbers into binary 5 bits, the error detection signal is added to the contents in the error counter 70. The counted value is stored in the error counter 70 to fulfill the bit error count function. In order to calculate the bit error rate, this error count value is read by a controller CPU every predetermined time interval. The error rate is calculated based on the error count value and the predetermined time period and the final test result is output by, for example, a display.

In FIG. 7a, the above explanation is made for the configuration where the verifier 65 receives the parallel data converted by demultiplexer 63 and 64. On the other hand, as shown in FIG. 7b, there is another example of configuration in which the synchronization and the error count are accomplished by providing serial data directly to the verifier 65 and providing a bit error detection signal 65d of one bit to the error counter 70 and the pattern synchronizing part 66.

As explained above, since the conventional bit error measurement apparatus obtains the error rate data solely from the error counter 70, it is difficult to specifically analyze, investigate or identify causes of errors in a signal under measurement. To specify such causes of errors in a signal under test, the measurement have to be repeated after modifying the contents of a test pattern to be generated by the pattern generator 71 and test pattern generator 62 to see whether the bit error rate will increase and/or decrease. From this result, the pattern conditions which are the cause of increase or decrease in bit error rates could be identified.

As has been foregoing, in the conventional measurement apparatus, although the error rate can be obtained by means of the error counter 70, it is necessary to modify the test pattern, repeat the measurement plural times and compare these results in order to specify the pattern conditions which cause the occurrence of error rate. Thus, the conventional bit error rate measurement apparatus is inconvenient and cumbersome for fully analyzing the cause of error in the signal under test. Thus, there is a need to provide an improved bit error measurement apparatus.

SUMMARY OF THE INVENTION

Therefore, it is an object of the present invention to provide an error bit measurement apparatus which is capable of easily specifying pattern conditions which cause bit errors without measuring all of the test patterns by providing a means for measuring a bit error rate at a selected position or region of a test pattern.

The first aspect of the bit error rate measurement apparatus of the present invention includes, a test pattern generator which installs and generates test patterns for verifying an incoming signal to be tested by a verifier, a pattern position detector which detects a region of the test pattern when receiving a synchronizing signal from the test pattern generator and generates a count enable signal corresponding to this detected region, an error counter which starts or stops counting bit error detection signals from the verifier on the basis of the count enable signal from the pattern position detector. By these settings, error rates of arbitrary regions of the test pattern corresponding to the signal under test can be identified.

In the present invention, a desired position or region of the test pattern is selected by incorporating the pattern position detector. The pattern position detector of the present invention includes a pattern counter for receiving the synchronizing signal from the test pattern generator and counting the number of the synchronizing signal, a lower limit register which provides a lower limit value defining one end of the measurement region of the test pattern, a lower limit comparator which compares output value of the pattern counter and the lower limit value from the lower limit register and outputs a lower limit detection signal, an upper limit register which provides an upper limit value defining other end of the measurement region of the test pattern, au upper limit comparator which compares output value of the pattern counter and the upper limit value from the upper limit register and outputs an upper limit detection signal, and a count enable signal generator which receives output signals from the lower limit comparator and the upper limit comparator and generates the count enable signal for the error counter on the basis of the output signals from the comparators.

In another aspect of the present invention, the pattern position detector is capable of masking desired bits of data for measuring a plurality of regions of the test pattern. The pattern position detector includes a pattern counter for receiving the synchronizing signal from the test pattern generator and counting the number of the synchronizing signal, a lower limit register which provides a lower limit value defining one end of said measurement region of the test pattern, a lower limit mask register which provides mask bits for masking desired bits of pattern signal, a lower limit comparator which compares output value of the pattern counter and the lower limit value from the lower limit register and outputs a lower limit detection signal and the comparator receives the mask bits from the lower limit mask register for masking data bits of the output value from the pattern counter and the lower limit value from the lower limit register on the basis of the mask bits, an upper limit register which provides an upper limit value defining other end of the measurement region of the test pattern, an upper limit mask register which provides mask bits for masking desired bits of pattern signal, an upper limit comparator which compares output value of the pattern counter and the upper limit value from the upper limit register and outputs an upper limit detection signal and the comparator receives the mask bits from the upper limit mask register for masking data bits of the output value from the pattern counter and the upper limit value from the lower limit register on the basis of the mask bits, and a count enable signal generator which receives output signals from the lower limit comparator and the upper limit comparator and generates the count enable signal for the error counter on the basis of the output signals from the comparators.

The bit error measurement apparatus of the present invention can also be configured to include a plurality of pattern position detectors for receiving the synchronized signal from the test pattern generator for detecting a plurality of measurement regions at the same time, and a plurality of error counters for counting bit error detection signal from the verifier and the error counters are controlled in start and stop timings of counting the error detection signals by the count enable signals from the plurality of pattern position detectors.

BRIEF DESCRIPTION OF THE DRAWINGS

FIG. 5a is a block diagram showing a configuration of the pattern position detector of the present invention which is provided with mask registers, and FIG. 5b is a schematic block diagram explaining a masking operation in the pattern position detector of FIG. 5a.

DESCRIPTION OF THE PREFERRED EMBODIMENTS

The preferred embodiments of the present invention are described in the following with reference to the drawings.

Figure 2:
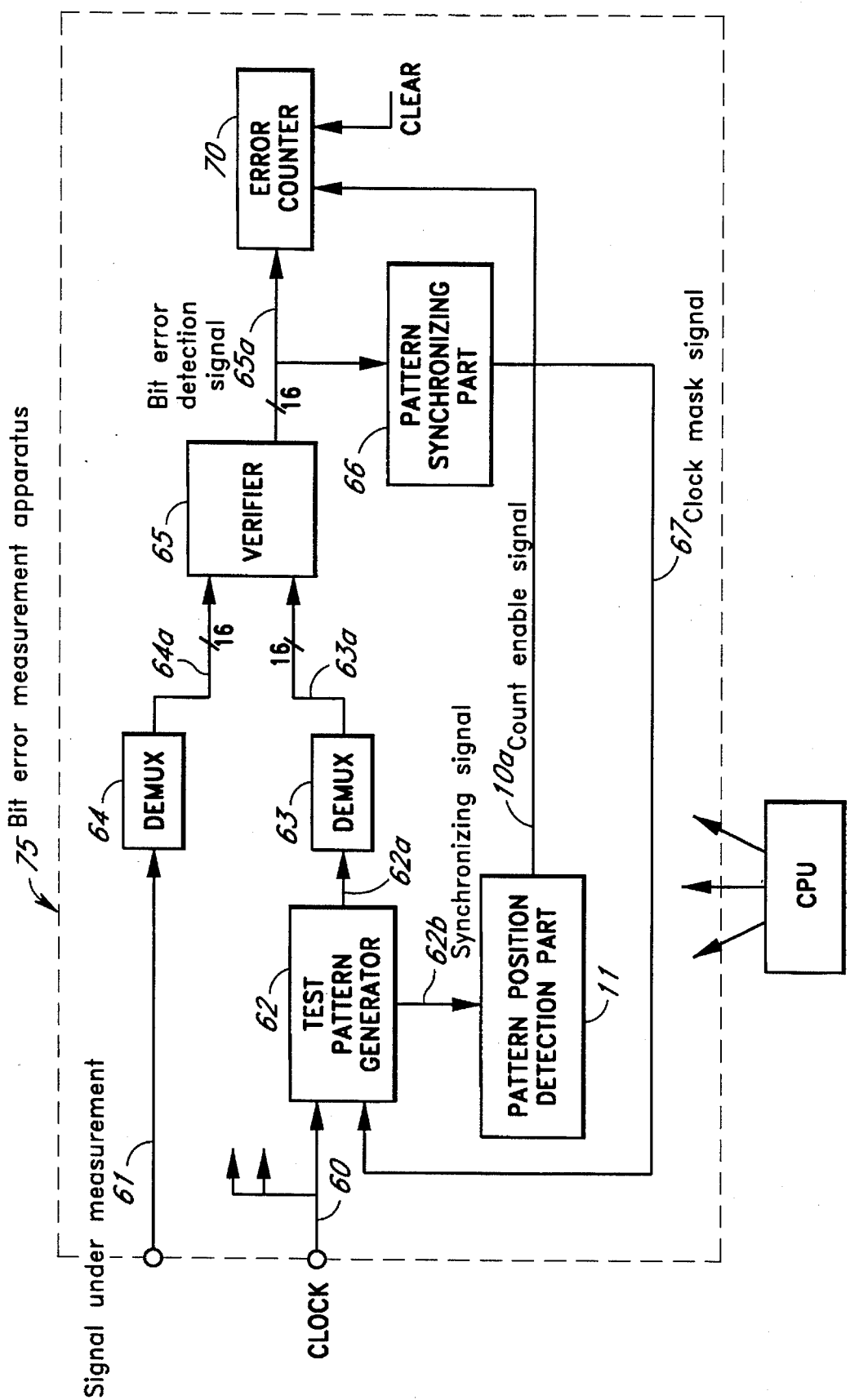
FIG. 2 is another example of block diagram showing a bit error measurement apparatus of the present invention which is capable of specifying desired regions of test pattern.

A bit error rate measurement apparatus of the present invention includes, as shown in FIG. 2, a pattern position detector 11 which determines a range of pattern, i.e., from which pattern position to which pattern position of a test pattern from the test pattern generator 62 a bit error test should be performed by an error counter 70. Such positions are identified with respect to, for example, a synchronizing signal 62b which indicates the head of the test pattern from the test pattern generator 62. A controller CPU is provided for controlling an overall processes of bit error measurement.

Figure 4:
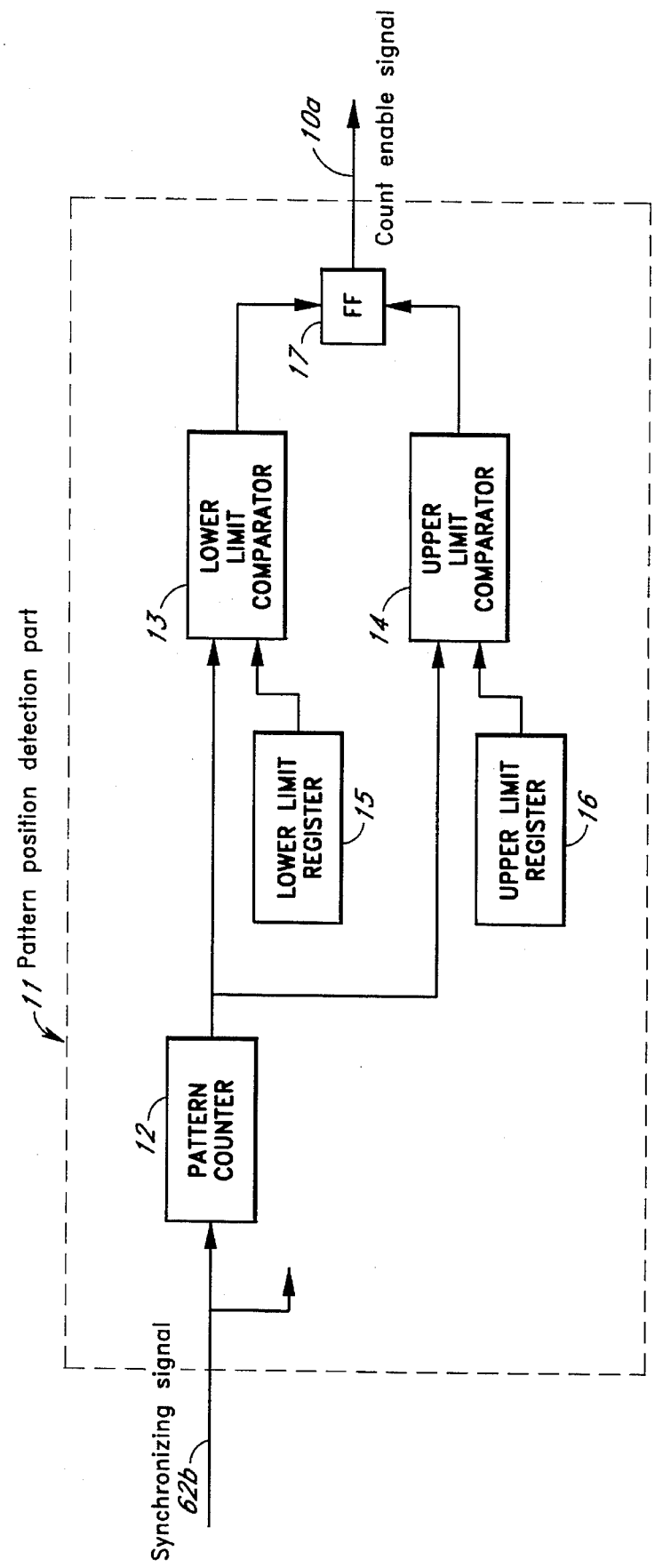
FIG. 4 is a block diagram showing more specific configuration of a pattern position detector in accordance with the present invention.

The pattern position detector 11, as shown in FIG. 4, comprises a pattern counter 12, a lower limit comparator 13, a lower limit register 15, an upper limit comparator 14, an upper limit register 16, and a flip flop 17. The pattern counter 12 is provided with the synchronizing signal 62b from the test pattern generator 62. The output of the pattern counter 62 is connected to the lower limit comparator 13 and the upper limit comparator 14. The lower limit register 15 and the upper limit register 16 respectively provide positional values indicating a start position and a stop position of the test pattern to the comparators 13 and 14. The flip-flop 17 receives a set signal from the lower limit comparator 13 and a reset signal from the upper limit comparator 14 and generates a count enable signal which controls the error counter 70.

Before executing the test, test patterns with various conditions are stored in the test pattern generator 62 for each error measurement region. The error measurement region here means a selected range of a test pattern between the positional value defined in the lower limit register and the positional value defined in the upper limit register.

After this initial setting, the pattern counter 12 receives the synchronizing signal 62a from the test pattern generator 62 and clears the count value with zero. The flip flop 17 also clears the count enable signal 10a with OFF state by the synchronizing signal 62b. The synchronizing signal 62b is synchronous with the test pattern which is, for example, in a 16 bit parallel form and generated from the test pattern generator 62. Thus, every time generating the parallel 16 bit test pattern, the pattern counter 12 increments by one.

The counted data from the pattern counter 12 is provided to both the lower limit comparator 13 and the upper limit comparator 14. The lower limit register 15 and the upper limit register 16 store a lower limit value and an upper limit value, respectively, which compare with the counted value from the pattern counter 12 at the comparators 13 and 14. The lower limit value and the upper limit value in the registers 15 and 16 designate the start and stop positions for determining an interested measurement region of the test pattern.

The lower limit comparator 13 compares the counted output value from the pattern counter 12 with the value defined by the lower limit register 15. When the agreement is obtained, a coincidence signal is sent to the flip flop 17 to change the flip flop 17 to an ON state. Then the count enable signal output 10a of the flip flop 17 is sent to the error counter 70 to switch to an enable state. The error counter 70 starts counting bit errors.

The upper limit comparator 14 compares the counted output value from the pattern counter 12 with the value defined by the upper limit register 16. When the agreement is reached, a coincidence signal is sent to the flip flop 17 to change the flip flop 17 to an OFF state. Thus, the error counter 70 is disabled and stopped counting the error bits.

By the configuration and the measurement as mentioned above, the region defined by the lower limit and upper limit registers 15 and 16 can be selectively tested and the data is read out by CPU from the error counter 70 after a predetermined time or test pattern cycles. The measured region can be specified with respect to the total test pattern since the ratio of the numbers of steps in the test pattern within the lower and upper limit and the total test pattern is known by a simple calculation. From these values, a bit error rate for the specified region can be obtained separately from the other test pattern.

After the measurement for the specified region of test pattern is finished, the measurement for the next measurement region will be executed. For doing that, new limit values for specifying the next measurement region are provided from CPU and set in the lower limit register 15 and the upper limit register 16, respectively. Further, CPU resets the error counter 70 to an initial state. Hereafter, the measurement for the next measurement region is performed in the same way as described above.

As a result, it is easy to determine an error rate for a selected region or position of the test pattern with respect to the total test pattern. Therefore, if a test pattern having a plurality of pattern regions with different pattern conditions stored in the pattern generator and is used for this test, pattern conditions which tend to increase or decrease the bit error rates in the incoming signal can be easily specified with one test pattern.

FIG. 5 shows another preferred embodiment of the present invention. In FIG. 5, further to the configuration shown in FIG. 4, the pattern position detector 11 is provided with a lower limit mask register 21 and an upper limit mask register 22. The lower limit mask register 21 provides mask data to the lower limit comparator 13 to mask desired bits of the lower limit value from the register 15 and the count value from the pattern counter 12. The upper limit mask register 22 provides mask data to the upper limit comparator 14 to mask desired bits of the upper limit value from the register 16 and the count value from the pattern counter 12.

Figure 5B:
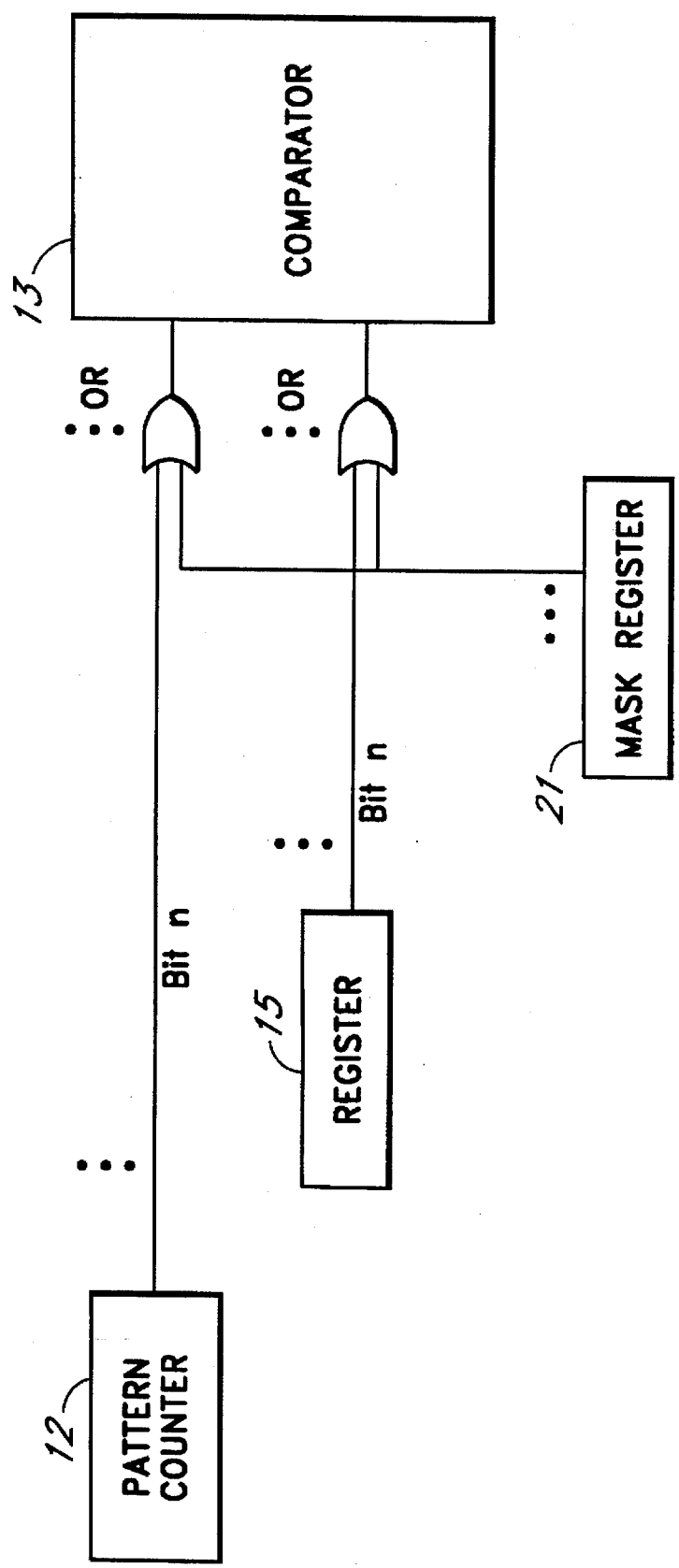
Figure 6:
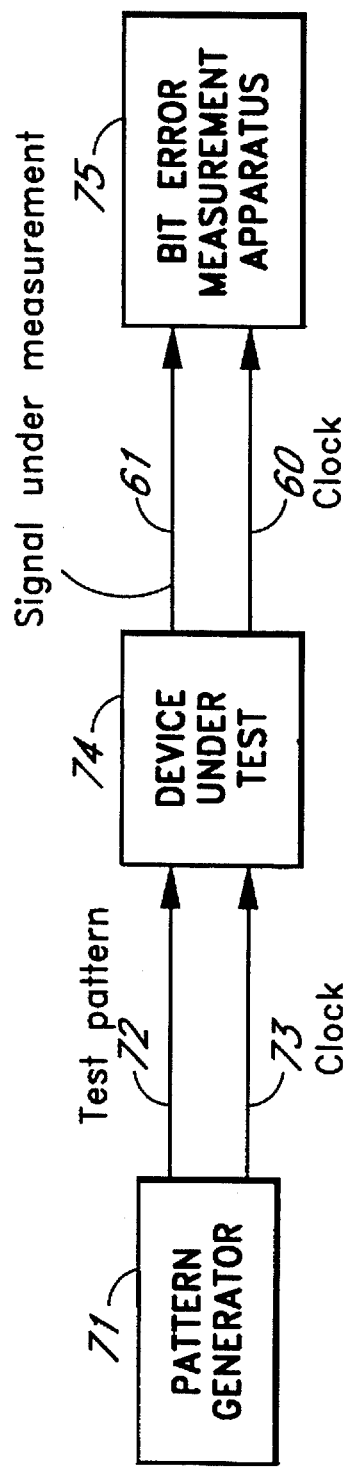
FIG. 6 shows an example of basic configuration for testing bit error rates of a signal pattern by using a bit error rate measurement apparatus.
Figure 7A:
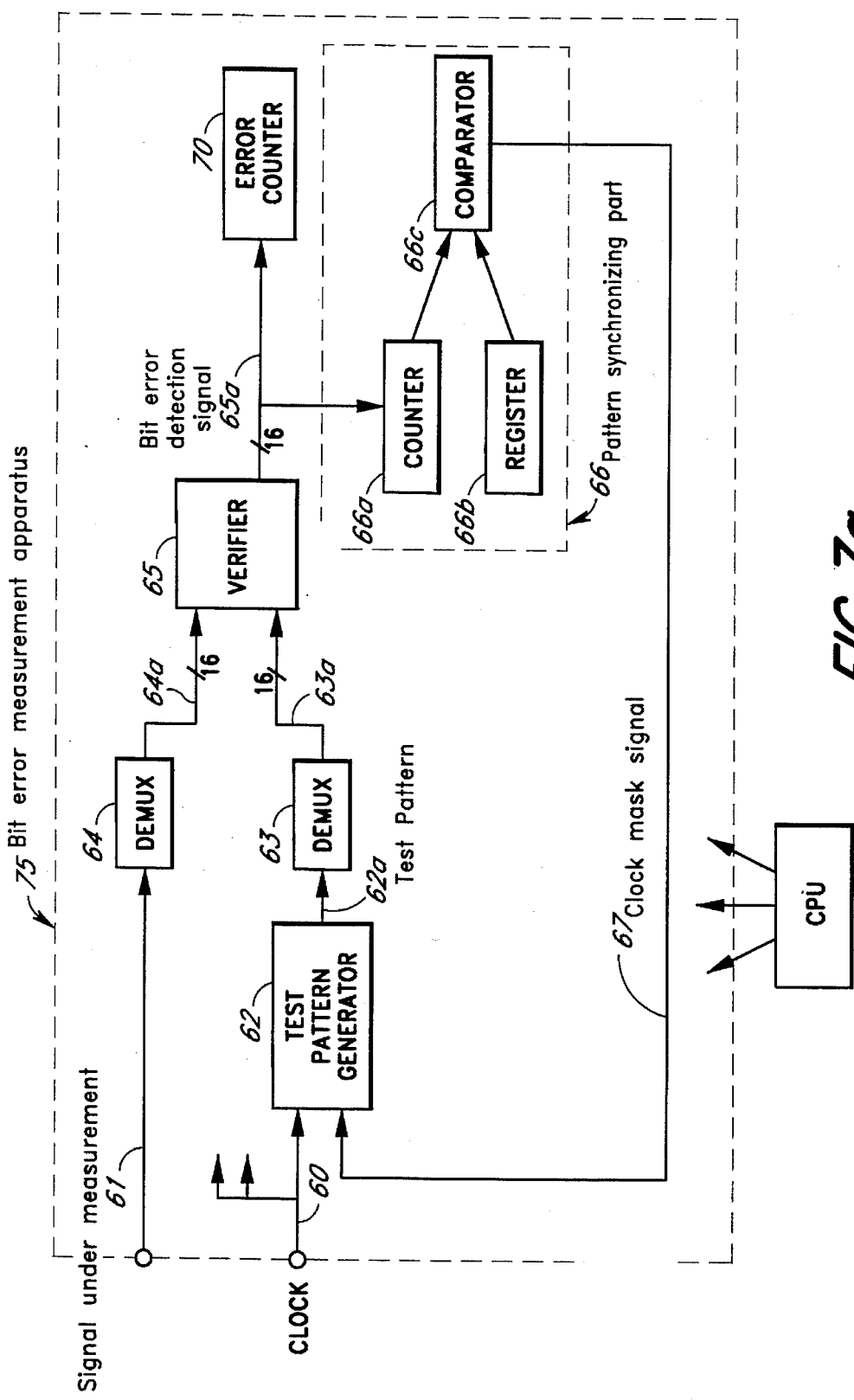
FIG. 7a is a block diagram showing an example of conventional bit error measurement apparatus which verifies parallel converted data by a verifier.
Figure 7B:
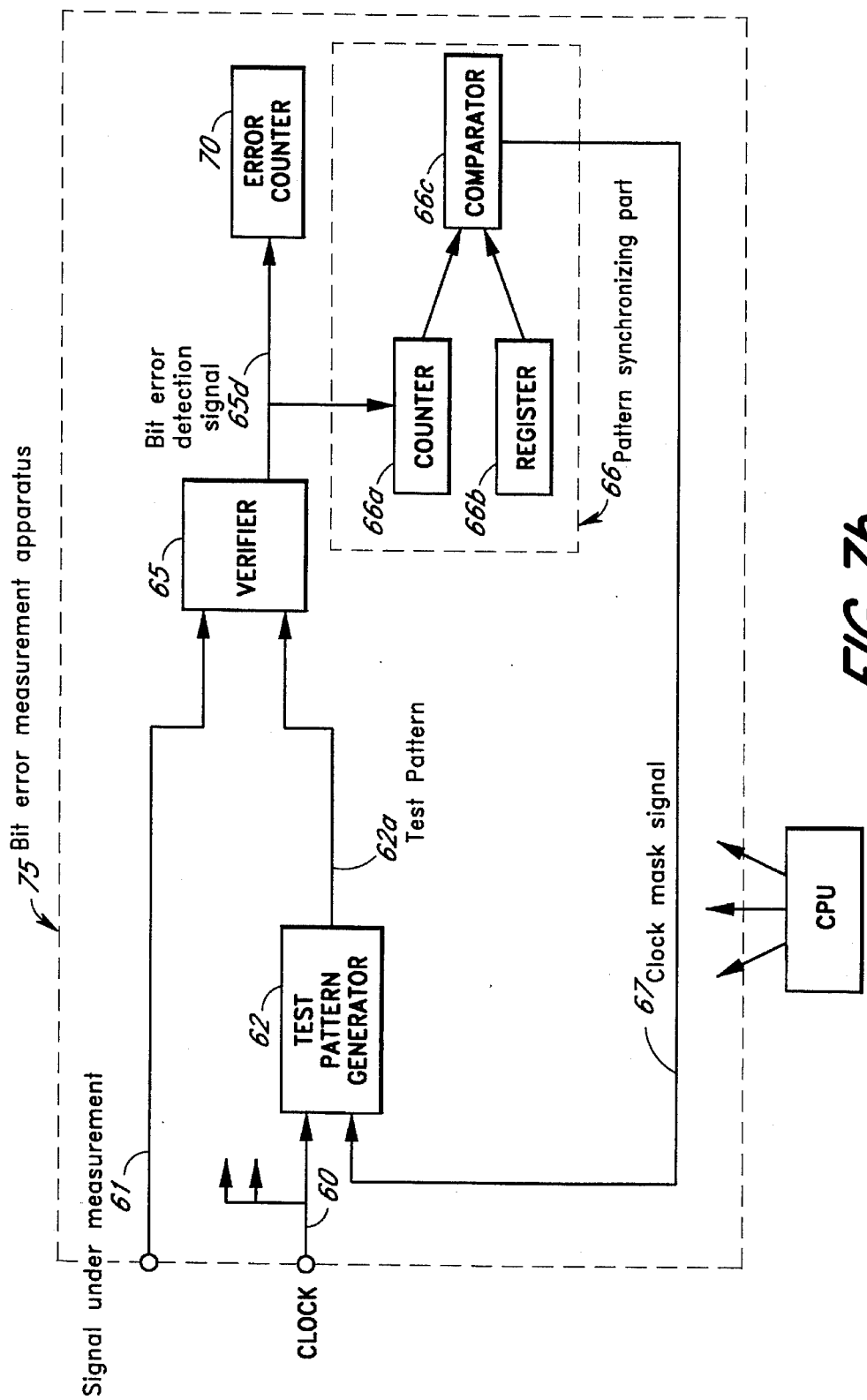
FIG. 7b is a block diagram showing an example of conventional bit error measurement apparatus which transfers serial data directly to the verifier.

In this configuration, a masking operation is performed for desired data bits sent to the lower limit comparator or to the upper limit comparator. An example of more specific circuit for the masking operation is shown in FIG. 5b to be associated with the lower limit comparator 13. The masked bits to be sent to the comparator 13 are formed through OR gates of FIG. 5b. The counted value from the pattern counter 12 and the comparison value from the register 15 are respectively ORed by predetermined bits provided from the mask register 21. By this, the state of agreement is always brought regardless of the lower limit register bit 15 in the masked bit position. The same circuit configuration shown in FIG. 5b is also applicable to the masking operation for the upper limit comparator 14.

When the configuration is made like this, bit error numbers not only for one measurement region but also for plural measurement regions corresponding to the mask bits defined by the mask register are obtained and accumulated. Therefore, it is easy to measure an average error rate of these plural measurement regions.

Figure 3:
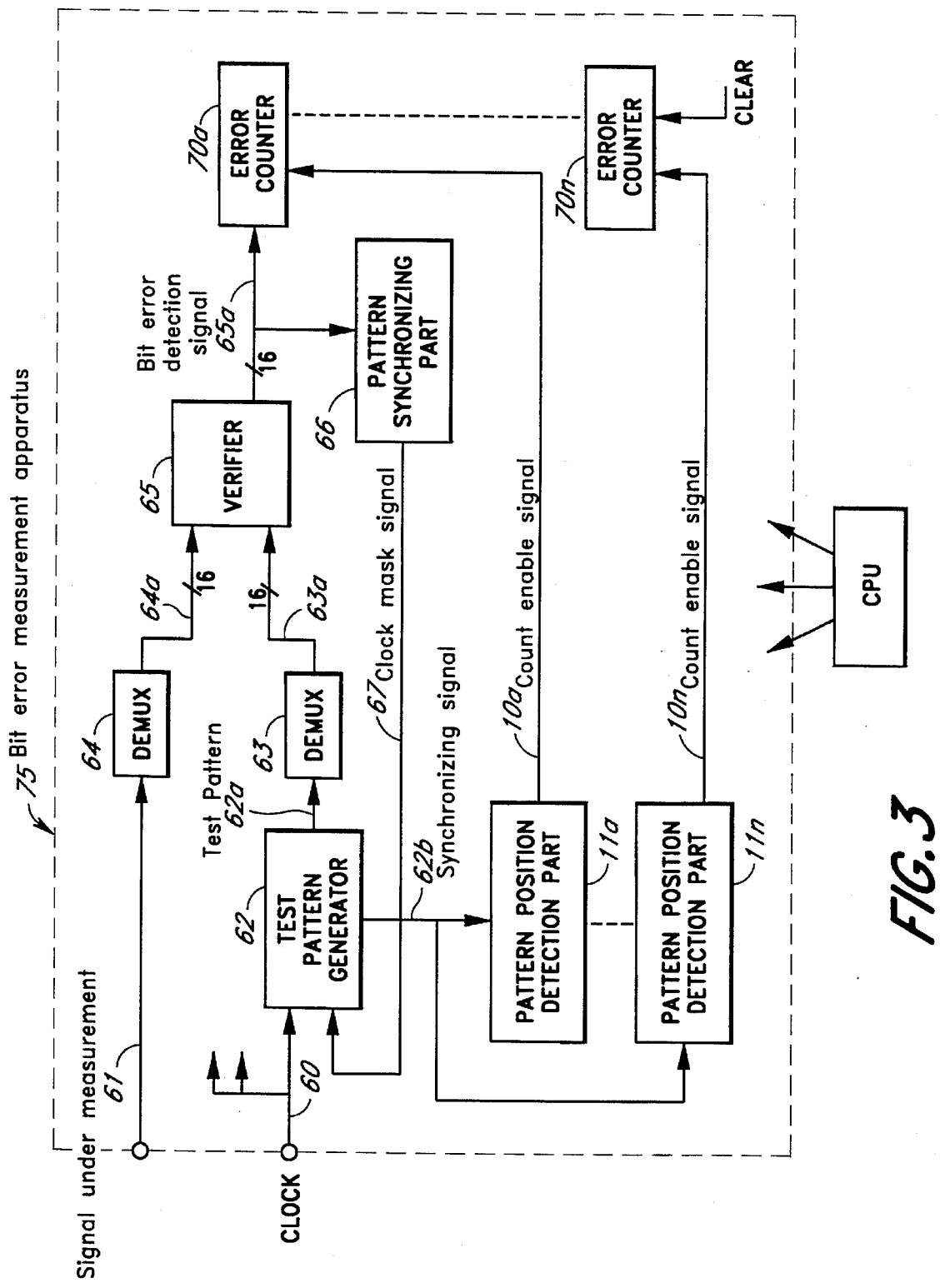
FIG. 3 is another example of block diagram showing a bit error measurement apparatus of the present invention which is capable of specifying plural regions of test pattern and counting plural errors at the same time.

FIG. 3 shows another preferred embodiment of the present invention. In the embodiments described above, only one set of pattern position detector 11 and an error counter 70 is provided in the measurement apparatus. In contrast, the embodiment of FIG. 3 shows an example of configuration having a plurality of pattern position detectors 11a–11n and error counters 70a–70n.

In the embodiment of FIG. 2, the bit error measurement is performed plural times by changing the region of test patterns. However, since the plural sets of pattern position detector and error counter are provided, the measurement for two or more different measurement pattern regions can be executed at the same time without any interruption so that the measurement takes within a very short time. Each of the pattern position detectors 11a–11n can be configured either as shown in FIG. 4 or in FIG. 5a.

Figure 1:
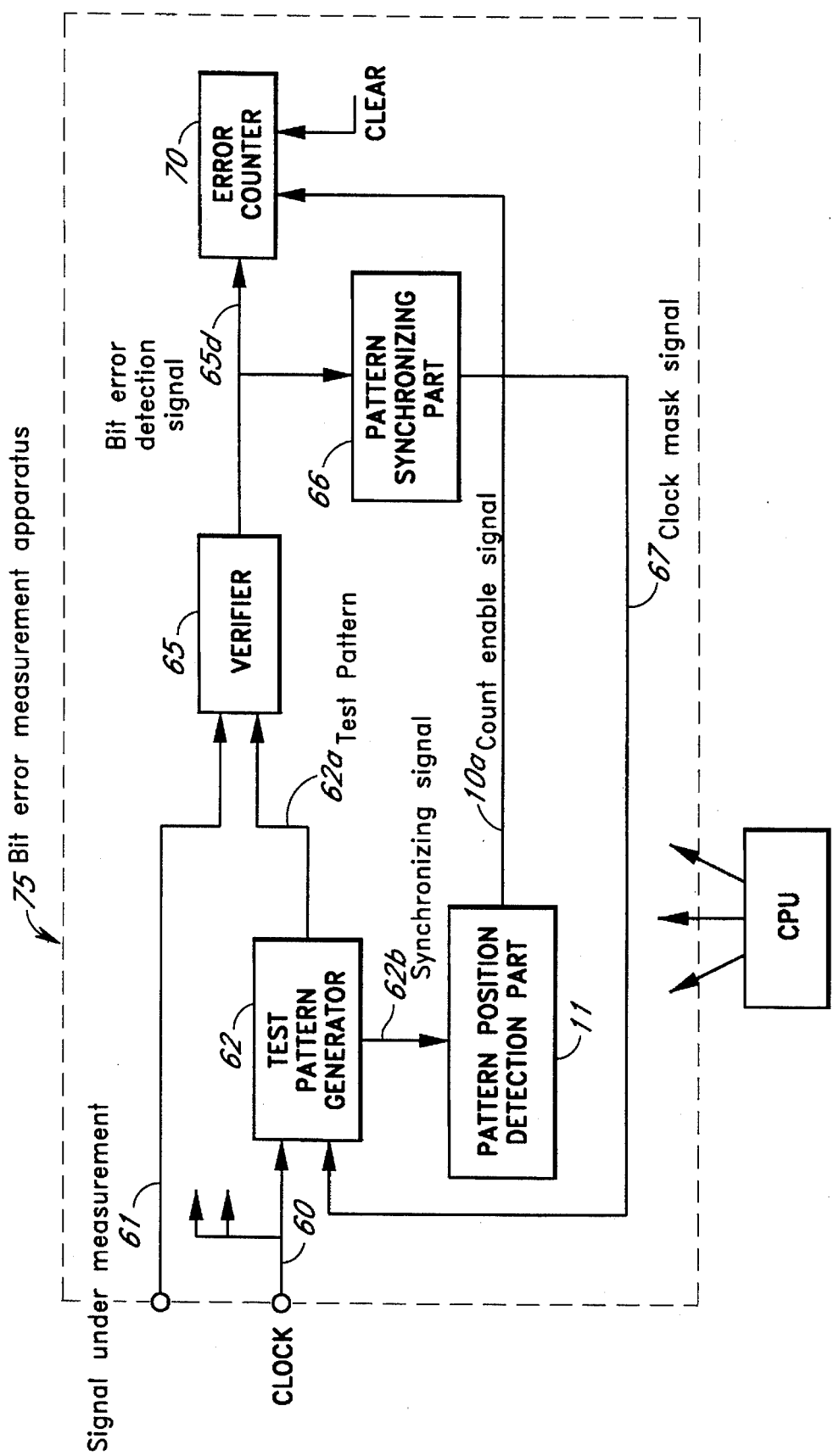
FIG. 1 is an example of block diagram showing a bit error measurement apparatus of the present invention which is capable of specifying desired regions of test pattern.

FIG. 1 shows a further embodiment of the present invention. In the preferred embodiment of FIGS. 2 and 3 show the demultiplexers 63 and 64 to provide parallel data to the verifier 65 by serial-parallel converting the incoming signal. In contrast, in the embodiment of FIG. 1, serial data to be tested and the serial test pattern are directly supplied to the verifier 65 for verification. Thus, one bit error detection signal 65d is output from the verifier 65 to the error counter 70 to be counted and also sent to the pattern synchronizing part 66 to establish synchronization between the signal under test and the test pattern.

As this invention is configured as explained above, the following effect is brought. By storing the pattern contents with pattern conditions changed at each measurement regions in the test pattern generator 62 and clearing the error counter 70 after setting lower limit register 15 and upper limit register 16, which is to be the section corresponding to the next pattern conditions after each measurement, from CPU to measure, the error rate with these pattern conditions can be measured almost continuously. Therefore, once the test pattern contents are set in the test pattern generator 62, it is easy to specify the pattern conditions which caused an increase or a decrease in the error rate.

Conventionally, the synchronization waiting time is needed to synchronize a signal pattern to be tested and a test pattern when the test pattern is changed and stored. In this invention, however, the interrupted times of measurement caused by this synchronization waiting time can be decreased so that the measuring time can be shortened.

Also, in the case of measuring the error rate while fine-adjusting the conditions of the device under test 74, the adjustment for the device under test 74 itself becomes easy because the error measurements with different pattern conditions can be executed continuously so that the change or the increase/decrease of the error rates among plural pattern conditions can be compared easily.

Further, in the case of setting plural pattern position detectors 11a–11n and error counters 70a–70n, the error rates in the device under test 74 can be measured at the same time. In the error rate measurement requiring a fixed environment conditions, this brings an advantage that the error range between the measured values can be made small and the errors can be compared with high reliability. And, of course, the error measurement can be executed at high speed.

Furthermore, in the case of evaluation and measurement by changing the conditions of the device under test 74, the mistakes such as data measurement or comparison by the conditions of different unit under test 74 are eliminated and ideal data correlation between each error measurement data can be collected.

We claim:

1. A bit error measurement apparatus which measures an error rate of an incoming signal with respect to a selected region of a test pattern, comprising:

a test pattern generator which generates a test pattern for verifying said incoming signal to be tested;

a verifier which receives said incoming signal and said test pattern and generates an error detection signal when said incoming signal and said test pattern disagree;

a pattern position detector connected to said pattern generator to detect a measurement region of said test pattern when receiving a synchronizing signal from said test pattern generator, said pattern position detector generating a count enable signal corresponding to said detected measurement region, said measurement region being determined by a lower limit value and an upper limit value stored in said pattern position detector; and an error counter connected to said verifier to count said error detection signal, an operation of said error counter being controlled by said count enable signal from said pattern position detector;

wherein said pattern position detector comprising:

a pattern counter for receiving said synchronizing signal from said test pattern generator and counting the number of generation sequence of said test pattern by said test pattern generator;

a lower limit comparator connected to said pattern counter to receive an output value of said pattern counter representing said number of said generation sequence of said test pattern;

a lower limit register connected to said lower limit comparator to provide said lower limit value defining one end of said measurement region of said test pattern to said lower limit comparator;

said lower limit comparator comparing said output value of said pattern counter and said lower limit value from said lower limit register, said lower limit comparator generating a lower limit detection signal when said output value of said pattern counter reaches said lower limit value;

an upper limit comparator connected to said pattern counter to receive said output value of said pattern counter;

an upper limit register connected to said upper limit comparator to provide said upper limit value defining the other end of said measurement region of said test pattern to said upper limit comparator;

said upper limit comparator comparing said output value of said pattern counter and said upper limit value from said upper limit register, said upper limit comparator generating an upper limit detection signal when said output value of said pattern counter reaches said upper limit value; and a count enable signal generator which receives output signals from said lower limit comparator and said upper limit comparator and generates said count enable signal for said error counter on the basis of said output signals from said comparators.

2. The bit error measurement apparatus as defined in claim 1, wherein:

said count enable signal generated by said count enable signal generator changes to an enabling state by receiving said lower limit detection signal from said lower limit comparator and to a disabling state by receiving said upper limit detection signal from said upper limit comparator.

3. The bit error measurement apparatus as defined in claim 1, wherein said pattern position detector further includes:

a lower limit mask register connected to said lower limit comparator to provide mask bits for masking desired bits of a pattern signal; and an upper limit mask register connected to said upper limit comparator to provide mask bits for masking desired bits of a pattern signal.

4. The bit error measurement apparatus as defined in claim 1, wherein:

said pattern position detector is formed of a plurality of detectors for receiving said synchronized signal from said test pattern generator for detecting a plurality of measurement regions;

said error counter is formed of a plurality of counters for counting bit error detection signal from said verifier, counting operations of said plurality of counters being controlled by count enable signals from said plurality of detectors.

5. The bit error measurement apparatus as defined in claim 1, further includes a first serial-parallel converter for receiving said incoming signal to be tested and converting said incoming signal to a first parallel signal to provide to said verifier, and a second serial-parallel converter for receiving said test pattern from said test pattern generator and converting said test pattern to a second parallel signal to provide to said verifier.

6. The bit error measurement apparatus as defined in claim 1, further includes a pattern synchronizing part connected between said verifier and said test pattern generator for detecting a synchronization point between said incoming signal to be tested and said test pattern.

7. The bit error measurement apparatus as defined in claim 6, wherein said pattern synchronizing part includes:

a synchronization detection counter for counting the number of said error detection signal generated by said verifier;

a threshold comparator connected to said synchronization counter to receive an output value of said synchronization detection counter representing a number of said error detection signal; and a threshold register connected to said threshold comparator to provide a threshold value for defining said synchronization point between said incoming signal and said test pattern;

wherein said threshold comparator comparing said output value of said synchronization counter and said threshold value from said threshold register, said threshold comparator generating a clock mask signal to be supplied to said test pattern generator until said output value of said synchronization counter reaches said threshold value.

* * * * *